United States Patent
Kim (10) Patent No.: US 8,676,266 B2
(45) Date of Patent: Mar. 18, 2014

(54) CONTROL SYSTEM FOR ANTENNA OF MOBILE COMMUNICATION BASE STATION AND IMAGE DATA OFFER SYSTEM AND METHOD TO USE THE CONTROL SYSTEM

(75) Inventor: Duk-Yong Kim, Gyeonggi-do (KR)

(73) Assignee: KMW, Inc., Dongtan-myeon, Hwaseong-si, Gyeonggi-do (KR)

( * ) Notice: Subject to any disclaimer, the term of this patent is extended or adjusted under 35 U.S.C. 154(b) by 219 days.

(21) Appl. No.: 13/059,447

(22) PCT Filed: Aug. 20, 2008

(86) PCT No.: PCT/KR2008/004845
§ 371 (c)(1),
(2), (4) Date: Feb. 17, 2011

(87) PCT Pub. No.: WO2010/021418
PCT Pub. Date: Feb. 25, 2010

(65) Prior Publication Data
US 2011/0151932 A1 Jun. 23, 2011

(51) Int. Cl.
*H04M 1/00* (2006.01)
(52) U.S. Cl.
USPC ........ 455/562.1; 455/63.1; 455/63.4; 455/82; 455/83; 455/129; 455/418; 455/419; 455/420; 455/561
(58) Field of Classification Search
USPC ........... 455/63.1, 63.4, 82, 83, 129, 418–420, 455/561, 562.1
See application file for complete search history.

(56) References Cited

U.S. PATENT DOCUMENTS

| | | | | |
|---|---|---|---|---|
| 6,069,462 | A | 5/2000 | Flynn | 318/565 |
| 7,990,325 | B2* | 8/2011 | Hunton et al. | 343/720 |
| 2004/0224700 | A1* | 11/2004 | Sawano | 455/456.1 |
| 2005/0003873 | A1* | 1/2005 | Naidu et al. | 455/575.7 |
| 2005/0190729 | A1* | 9/2005 | Roy et al. | 370/336 |
| 2006/0244675 | A1 | 11/2006 | Elliot et al. | |
| 2007/0004363 | A1* | 1/2007 | Kusaka et al. | 455/269 |
| 2007/0069885 | A1* | 3/2007 | Twitchell, Jr. | 340/539.1 |
| 2007/0149204 | A1* | 6/2007 | Redi et al. | 455/446 |

FOREIGN PATENT DOCUMENTS

| | | | |
|---|---|---|---|
| CN | 1264836 A | 8/2000 | |
| CN | 1749771 A | 3/2006 | |
| CN | 1889683 A | 1/2007 | |
| EP | 0 668 625 | 8/1995 | ............ H01Q 1/12 |
| JP | 2001-186557 A | 7/2001 | |
| JP | 2007-228495 A | 9/2007 | |

(Continued)

*Primary Examiner* — Ronald Eisner
(74) *Attorney, Agent, or Firm* — Cha & Reiter, LLC.

(57) ABSTRACT

A system for controlling a mobile communication antenna is provided, which includes a plurality of antenna systems each installed in a BS, and a remote control system for monitoring and controlling the plurality of antenna systems. In each of the antenna systems, an antenna module includes a radiation plate and a radiation device for transmitting and receiving radio signals for a mobile communication service, a sensor unit senses the inclination and horizontal rotation of the antenna module, a transceiver transmits data sensed by the sensor unit to the remote control system and receives a control signal from the remote control system, and a controller controls an operation of the antenna system according to the remote control signal received from the transceiver. In the remote control system, a BS monitoring information DB server accumulates the sensed data received from the plurality of antenna systems on a BS basis and an antenna system basis, and a remote control center outputs control signals to the antenna systems to monitor the antenna systems remotely.

14 Claims, 5 Drawing Sheets

(56) References Cited

FOREIGN PATENT DOCUMENTS

| JP | 2008-060861 A | 3/2008 |
| JP | 2004-128997 A | 4/2008 |
| JP | 2008-166995 A | 7/2008 |

\* cited by examiner

CONTROL SYSTEM FOR ANTENNA OF MOBILE COMMUNICATION BASE STATION AND IMAGE DATA OFFER SYSTEM AND METHOD TO USE THE CONTROL SYSTEM

This application makes reference to and claims all benefits from an application entitled, CONTROL SYSTEM FOR ANTENNA OF MOBILE COMMUNICATION BASE STATION AND IMAGE DATA OFFER SYSTEM AND METHOD TO USE THE CONTROL SYSTEM, filed on Aug. 20, 2008 and there duly assigned Serial No. PCT/KR2008/004845.

DETAILED DESCRIPTION OF THE INVENTION

The present invention generally relates to a control system for controlling a mobile communication Base Station (BS) antenna and a system and method for providing image information using the control system. More particularly, the present invention relates to a control system for controlling an antenna of a mobile communication BS, which senses and adjusts the inclination of the antenna and a deviation of a horizontal sector directional angle and provides image information acquired from means for sensing the antenna inclination as a profit model, and a image information providing system and method using the control system.

BACKGROUND TECHNOLOGY

In general, a mobile communication BS is installed in a service area requiring an appropriate antenna according to a network design and the vertical up/down tilt and the horizontal sector directional angle of a beam are appropriately set.

In order to adapt the installed antenna to the propagation environment of the site, a so-called Diagnostic Monitor (DM) test is carried out by measuring reception sensitivity across an actual overall service area and the vertical up/down tilting angle and horizontal sector directional angle of the antenna are optimized according to the DM test result.

Also, the down tilting angle and horizontal sector directional angle of the antenna are re-adjusted periodically according to a change in the subscriber distribution of the site, while continuing to monitor operation results.

However, it occurs in a real site environment that the inclination of a mast to which the antenna is installed changes due to external factors including storm or a clamp that ties the antenna to the mast is distorted horizontally. As a result, the antenna does not operate in an optimal manner, thereby making a reliable call service impossible.

Although this case is not caused by a technological defect in equipment, a remote control center cannot identify the cause. Thus to overcome the problem, the statuses of installed antennas are checked and cause analysis, readjustment, and optimization are performed for all sites.

Recently, mobile communication service providers mostly manage many sites by small personnel. That's why they cannot take an immediate action against problems in their sites, causing a high cost in a long term.

Moreover, the distance between a remote control center and a BS is not less than several hundreds of kilometers in some countries, thereby incurring a higher cost and taking a longer time in overshooting troubles.

DESCRIPTION OF THE INVENTION

To address the above problems, the present invention provides a mobile communication BS antenna control system for sensing, when an antenna is tilted or its horizontal sector direction angle is changed due to an external environment, the tilting or the change and remotely controlling the antenna.

The present invention also provides a system and method for providing image information using a mobile communication BS antenna controlling system, for creating a profit using image information acquired from a sensor that senses whether an antenna is tilted.

Technical Solution

According to one aspect of the present invention, there is provided a system for controlling a mobile communication antenna, which includes a plurality of antenna systems each installed in a BS, and a remote control system for monitoring and controlling the plurality of antenna systems. In each of the antenna systems, an antenna module includes a radiation plate and a radiation device for transmitting and receiving radio signals for a mobile communication service, a sensor unit senses the inclination and horizontal rotation of the antenna module, a transceiver transmits data sensed by the sensor unit to the remote control system and receives a control signal from the remote control system, and a controller controls an operation of the antenna system according to the remote control signal received from the transceiver. In the remote control system, a BS monitoring information DB server accumulates the sensed data received from the plurality of antenna systems on a BS basis and an antenna system basis, and a remote control center outputs control signals to the antenna systems to monitor the antenna systems remotely.

According to another aspect of the present invention, there is provided a system for controlling a mobile communication BS antenna, which includes a plurality of antenna systems each installed in a BS, and a remote control system for monitoring and controlling the plurality of antenna systems. In each of the antenna systems, an antenna module includes a radiation plate and a radiation device for transmitting and receiving radio signals for a mobile communication service, a vertical tilting driver vertically tilts the antenna module, a horizontal steering driver rotates the antenna module, a sensor unit senses the inclination and horizontal rotation of the antenna module, a transceiver transmits data sensed by the sensor unit to the remote control system and receives a control signal from the remote control system, a controller controls an operation of the antenna system according to the remote control signal received from the transceiver, and a memory stores data needed for operating the antenna system, including data sensed by the sensor unit under the control of the controller. In the remote control system, a BS monitoring information DB server accumulates the sensed data received from the plurality of antenna systems on a BS basis and an antenna system basis, and a remote control center outputs control signals to the antenna systems to monitor the antenna systems remotely.

According to a further aspect of the present invention, there is provided a system for providing image information using a mobile communication BS antenna, which includes a BS antenna controlling system and a server. In the BS antenna controlling system, each of a plurality of antenna systems has a camera module installed at a mobile communication BS antenna module, for capturing a full service area of the mobile communication BS antenna module, and transmits image data captured by the camera module to a remote control system, and a remote control system accumulates the sensed data received from the plurality of antenna systems on a BS basis and an antenna system basis in a BS image DB server and monitors and controls the plurality of antenna systems.

The server accesses the BS image DB server, retrieves the image data from the BS image DB server, and transmits image data of a BS corresponding to an area requested by remote users connected over a communication network to the remote users.

Effects

The mobile communication BS controlling system according to the present invention can monitor changes in the inclination and azimuth angle of an antenna at a remote control center and control the antenna remotely. Therefore, the inclination and azimuth angle changes can be corrected without the need for visiting a site in person. As a consequence, time and cost are saved.

In addition, use of image information captured from an image detection means for detecting changes in the inclination and azimuth angle of the BS antenna as a profit model brings about a profit increase.

The quality of public service can be improved by applying the image information to the public service.

DETAILED DESCRIPTION OF EMBODIMENTS

With the attached drawings, the configuration and operation of a mobile communication BS antenna controlling system according to the present invention will be described in detail.

Terms used in the specification and the claims are not limited to their literal meanings. Rather, they should be interpreted as meanings and concepts conforming to the scope and spirit of the present invention based on the principle that the inventor can define the concepts of terms appropriately to describe the invention best as he can.

Therefore, the embodiments described and the configurations illustrated herein are mere exemplary applications that do not embrace all technological aspects of the invention. Therefore, it is to be appreciated that the invention embraces all equivalents to the claims described.

Figure 1:
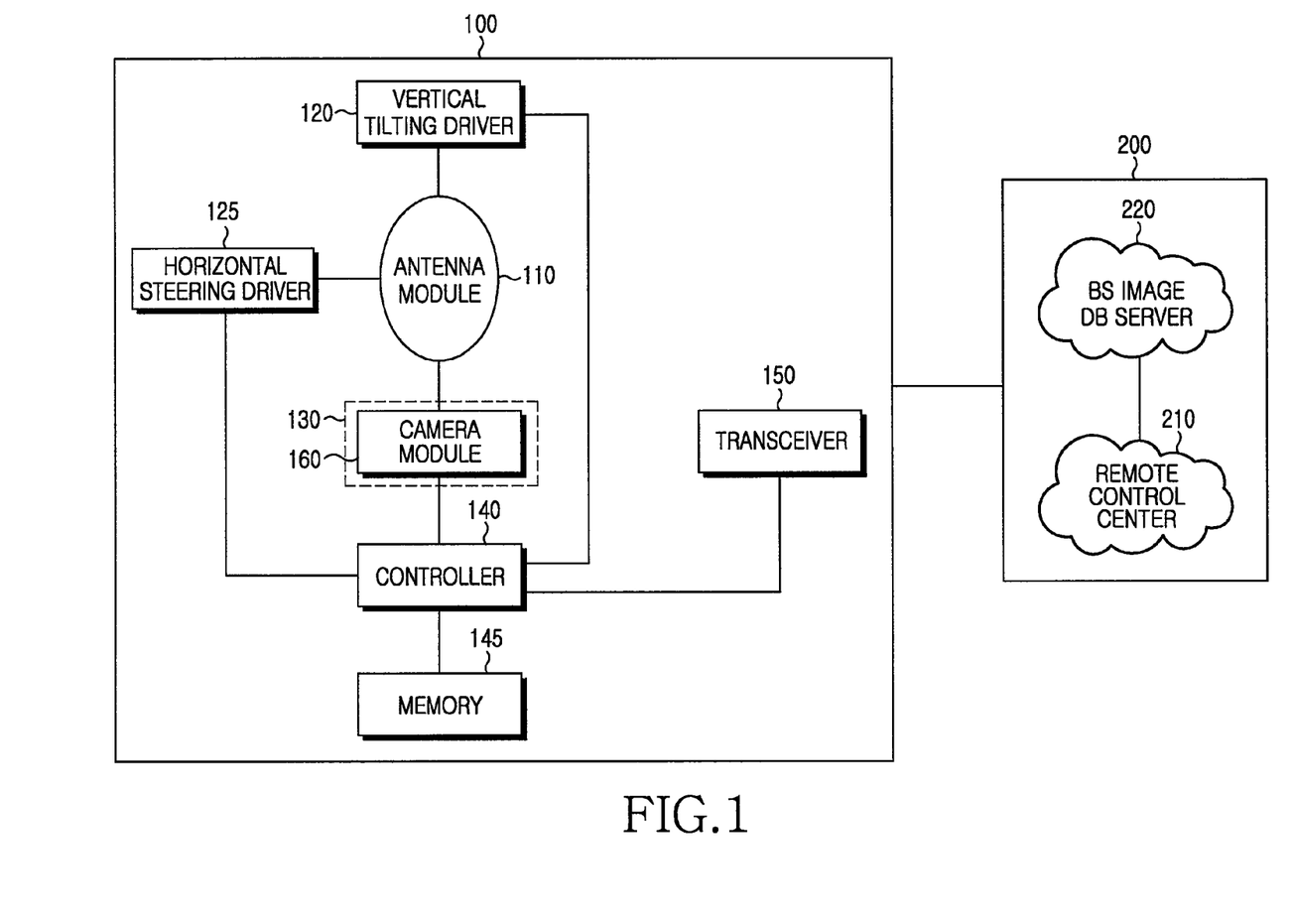
FIG. 1 is a block diagram of a mobile communication BS antenna controlling system according to an embodiment of the present invention.

FIG. 1 is a block diagram of a mobile communication BS antenna controlling system according to an embodiment of the present invention.

Referring to FIG. 1, the mobile communication BS antenna controlling system according to the embodiment of the present invention is divided by and large into an antenna system 100 and a remote control system 200 for monitoring and controlling the antenna system 100. Typically, a 3-sector BS uses three antenna systems 100, each per sector. The remote control system 200 at a remote distance can be connected to the antenna system 100 of each BS via a Base Station Controller (BSC) and a Mobile Switching Center (MSC) of a mobile communication network. Or the remote control system 200 can be installed in the BSC or the MSC.

To be more specific, the antenna system 100 includes an antenna module with a typical radiation plate and radiation device for transmitting or receiving radio signals for mobile communication services, a vertical tilting driver 120 for vertically tilting the antenna module 110, a horizontal steering driver 125 for horizontally steering the antenna module 110, a sensor unit 130 for sensing the inclination and horizontal rotation of the antenna module 110, a transceiver 150 for transmitting data sensed by the sensor unit 130 to the remote control system 200 and receiving a control signal from the remote control system 200, a controller 140 for controlling an overall operation of the antenna system 100 according to the control signal, including the operations of the vertical tilting driver 120 and the horizontal steering driver 125, and a memory 145 for storing data for the operation of the antenna system 100, including the sensed data under the control of the controller 140.

The antenna module 110 is for transmitting and receiving RF signals in the mobile communication BS. The antenna module 110 includes a directional antenna (a sector antenna) for transmitting a signal to a particular spot and an omni-directional antenna (an omni antenna) for transmitting a signal over a wide area in all directions.

The vertical tilting driver 120 tilts up and down a beam from the antenna module 110. The vertical tilting driver 120 includes a block for changing the direction of the beam by mechanically changing the vertical inclination of the antenna 110 and a block for electrically changing the vertical direction of the beam by changing the phase of the transmission signal. The phase changing block can be an electromechanical phase shifter or an electrical phase shifter, or both.

The horizontal steering driver 125 is for rotating the horizontal sector directional angle of the antenna. Like the vertical tilting driver 125, the horizontal steering driver 125 includes blocks for changing the sector directional angle through electrical steering as well as mechanical steering.

According to one aspect of the present invention, preferably, the sensor unit 130 is appropriately installed inside the ray dome of the antenna system 100. The sensor unit 130 may include a camera module 160 for fully capturing the service area of the antenna system 100. Needless to say, the camera module 160 can be installed outside the ray dome of the antenna system 100, for example, on the ray dome. Data sensed by the sensor unit 130 is still image or moving picture data captured by the camera module 160.

The camera module 160 captures the service area of the BS, and stores the captured image data in the memory 145, simultaneously with providing it to the remote control system 200 via the transceiver 150.

Basically, the controller 140 controls the operations of the vertical tilting driver 120 and the horizontal steering driver 125 according to a control signal received from the remote control center 200. In addition, the controller 140 can control the operations of the vertical tilting driver 120 and the horizontal steering driver 125 using the image data captured by the camera module 160. For example, the camera module 160 captures the service area when the antenna system 100 is initially installed in a normal manner and the controller 140 can store the captured image data as a reference image in the memory 145. Then, the controller 140 monitors whether there is a change in a capturing position by comparing the stored reference image with a later captured image. If the images are taken at different capturing positions, the controller 140 controls the vertical tilting driver 120 and the horizontal steering driver 125 to position the antenna module 110 so as to eliminate the change.

Meanwhile, the remote control system 200 may include a BS image DataBase (DB) server 220 for separating sensed data (image data in the embodiment of FIG. 1) received from antenna systems of BSs on a BS basis and on an antenna system basis and appropriately accumulating the separated data, functioning as a BS monitoring information DB. The remote control center 200 outputs the sensed data received from each BS in an appropriate format and it may be provided with an appropriate user interface (not shown) for outputting a control signal to each BS according to an operator manipulation.

The camera module 160 can be set to capture a still image with a relatively high quality at every predetermined interval (for example, several seconds to one hour). Under the circumstances or according to a status setting, the camera module 160 can be set to capture moving pictures in real time. The captured image data is immediately provided to the remote control system 200. Alternatively, the captured image data is first stored in the memory and then provided to the remote control system at appropriate intervals. This capturing scheme of the camera module 160 can be variably set according to a control signal associated with a predetermined capturing condition, received from the remote control system 200. The remote control system 200 selects a particular camera module 160 according to a request from a service server of an external Internet service provider connected to the remote control system 200 and provides image data captured by the selected camera module 160. Also, the remote control system 200 can set the capturing scheme of the camera module 160 variably.

The transceiver 150 of the antenna system 100 can transmit sensed data on a separately procured data channel between the BS and the remote control system 200. Similarly, the remote control system 200 can transmit a control signal on a separate control channel. Aside from this, the transceiver 150 can be so configured as to transmit the sensed data in the same manner as typical transmission of a mobile communication service signal. That is, phone numbers are allocated to the camera module 160 and the remote control system 200, for connecting a moving picture communication channel between them. In this case, the transceiver 150 transmits image data in the form of a radio signal for a mobile communication service and the antenna module 110 of a receiving antenna system 100 receives the image data and processes it in the same manner as a mobile communication service signal.

Figure 2:
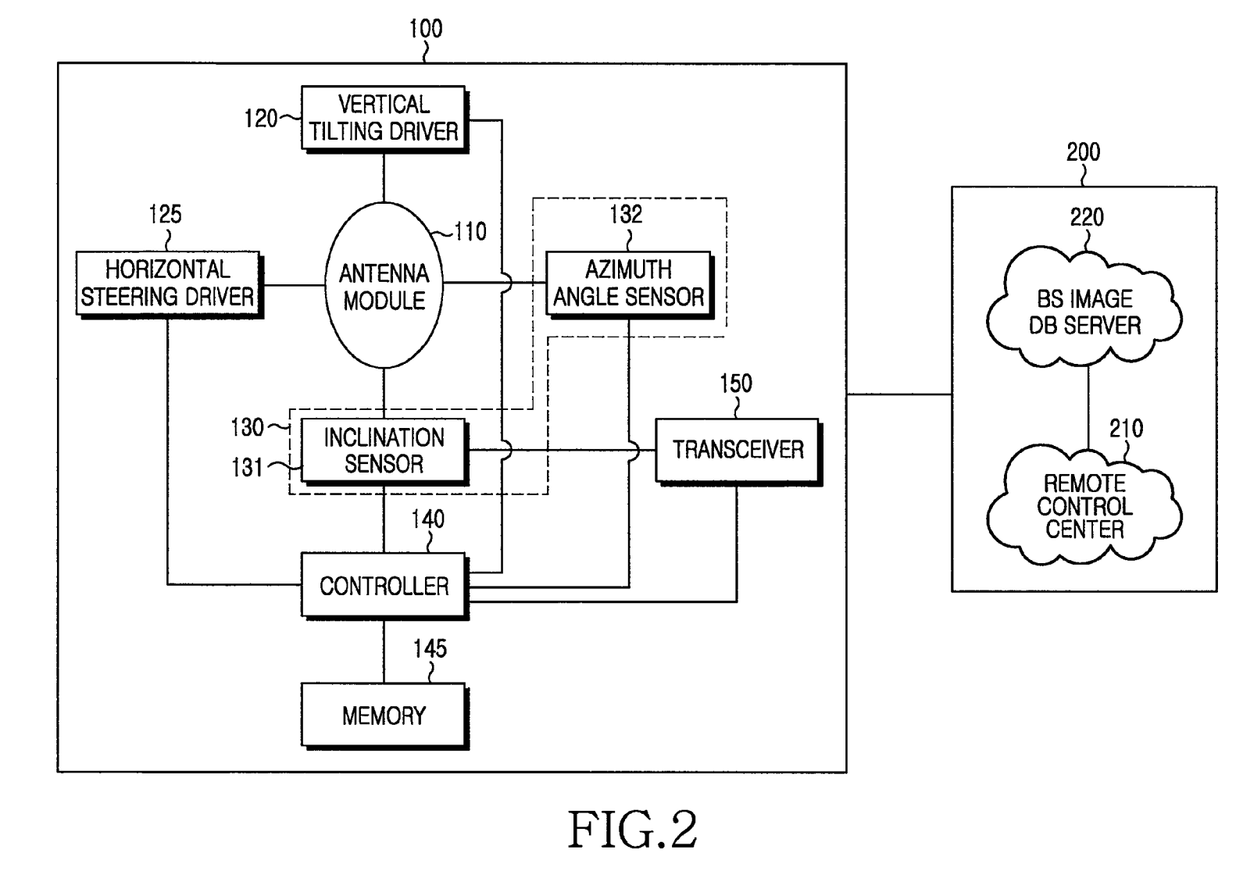
FIG. 2 is a block diagram of a mobile communication BS antenna controlling system according to another embodiment of the present invention.

FIG. 2 is a block diagram of a mobile communication BS antenna controlling system according to another embodiment of the present invention.

Referring to FIG. 2, the mobile communication BS antenna controlling system according to another embodiment of the present invention is similar to that illustrated in FIG. 1 except the configuration of the sensor unit 130. Instead of the camera module 160, the sensor unit 130 includes an inclination sensor 131 for sensing an inclination change of the antenna module 110 and an azimuth angle sensor 132 for sensing a horizontal rotation change of the antenna module 110. The inclination sensor 131 can be based on gravity and an electromagnetic-based hole sensor can be used as the azimuth angle sensor 32.

Typically, the antenna module 110 is installed vertically inclined at a predetermined angle depending on an optimal design or a field situation. Therefore, the inclination and azimuth angle of the antenna module 110 during the initial installation are set as a reference inclination and a reference azimuth angle, respectively and stored in the memory 145.

Then the controller 140 transmits sensed data received from the sensor unit 130 including the inclination sensor 131 and the azimuth angle sensor 132 to the remote control system 200 via the transceiver 150 and controls the vertical tilting driver 120 and the horizontal steering driver 125 according to a control signal received from the remote control system 200 via the transceiver 150. The remote control system 200 also stores sensed data associated with an inclination and an azimuth angle received from the antenna system 100 in the BS image DB server 220.

The controller 140 compares sensed values received from the inclination sensor 131 and the azimuth angle sensor 132 with the reference inclination and the reference azimuth angle stored in the memory 145. If they are different from the reference values by a predetermined range, the controller 140 can temporarily control the vertical tilting driver 120 and the horizontal steering driver 125 so that the sensed values return to the reference values. This is done to immediately overcome an obstacle although temporarily in the case where the inclination or horizontal rotation of the antenna module 110 is considerably changed too much to provide a mobile communication service.

Aside from the above, the mobile communication BS antenna controlling system illustrated in FIG. 2 is the same in configuration and operation as that illustrated in FIG. 1 and thus its detailed description is not provided herein. While the sensor unit 130 includes the inclination sensor 131 and the azimuth angle sensor 132 in the second embodiment of the present invention and it includes the camera module in the first embodiment of the present invention, it can be further contemplated as a third embodiment of the present invention that the sensor unit 130 includes all of the inclination sensor 131, the azimuth angle sensor 132, and the camera module 160. Besides, the sensor unit 130 may further include various sensors for sensing an external environment where the antenna system 100 is located, for example, temperature or humidity.

In the case where the sensor unit 130 includes the camera module 160 as in the first embodiment of the present invention, a change in a communication environment such as construction of a tall building in the service area can be easily recognized from sensed data and remote control of the antenna 110 is facilitated by the remote control system 200, as well as the inclination or horizontal rotation degree of the antenna system 100 is sensed. Therefore, a high-quality mobile communication service can be provided according to the changed communication environment.

Figure 3:
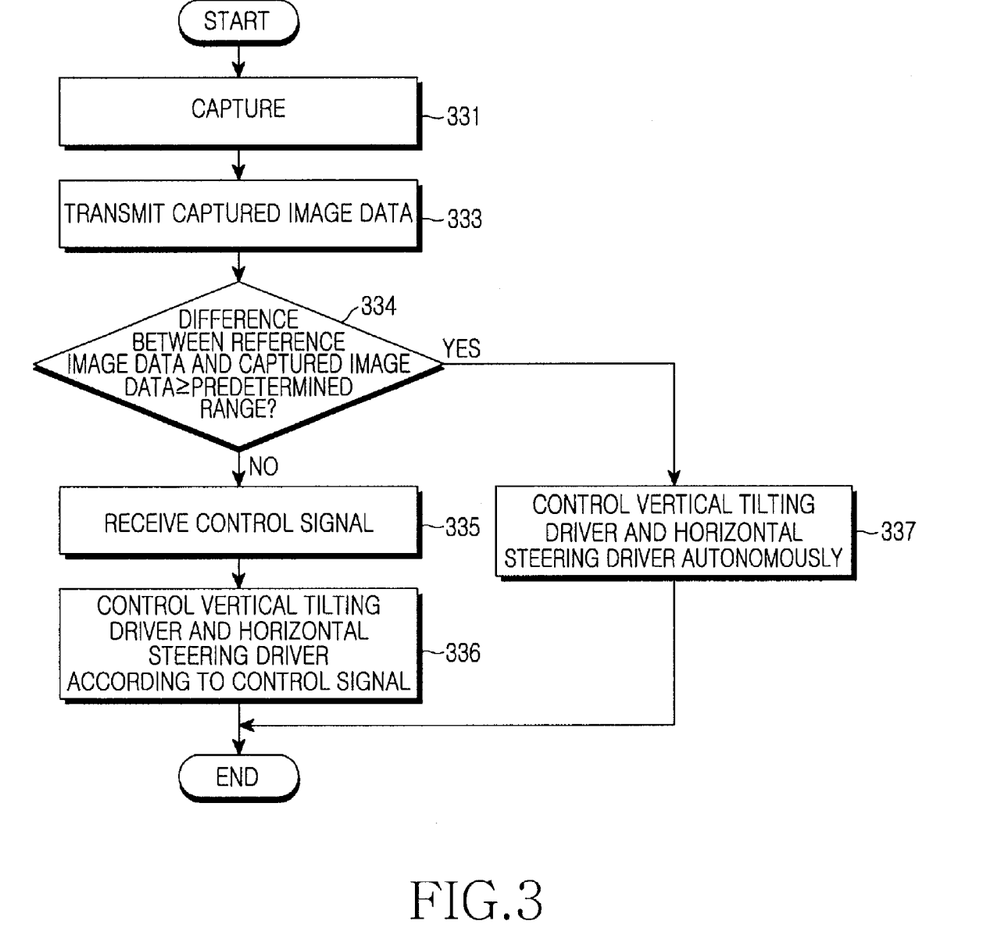
FIG. 3 is a flowchart illustrating an operation of an antenna system in a mobile communication BS antenna controlling system according to an embodiment of the present invention.

FIG. 3 is a flowchart illustrating an operation for controlling a mobile communication BS antenna controlling system according to an embodiment of the present invention. For example, the control operation can be performed in the antenna system 100 illustrated in FIG. 1.

Referring to FIG. 3, the camera module 331 of the sensor unit 130 installed in the antenna system 100 captures a service area to monitor whether the antenna is tilted or rotates due to an external environment like wind pressure in step 331. In step 333, the captured image data is transmitted to the remote control system 200.

In step 335, it is determined whether the inclination and rotation degree of the antenna are different from those of pre-stored reference image data by a predetermined or wider range by comparing the reference image data with the current captured image data. If the current captured image data is different from the reference image data by the predetermined or wider range, the antenna system 100 can perform a control operation for vertical tilting and horizontal steering in order to immediately compensate for the difference without waiting for a command from the remote control system 200 in step 337.

Meanwhile, if the captured image data is provided to the remote control system according to the operation of step 333, the remote control system 200 stores the captured image data in the BS image DB server 220. An operator of the remote control system 200 then can manipulate the remote control system 200 by checking an abnormality in the positioning of the antenna system 100 so that the remote control system 200 outputs a control signal for appropriate control. Therefore, when the antenna is tilted forward at five degrees, the remote control system 200 outputs a control signal for tilting up the antenna at five degrees.

Upon receipt of a control signal from the remote control system 200 in this manner in step 335, the antenna system 100 controls vertical tilting and horizontal steering according to the control signal in step 336.

Figure 4:
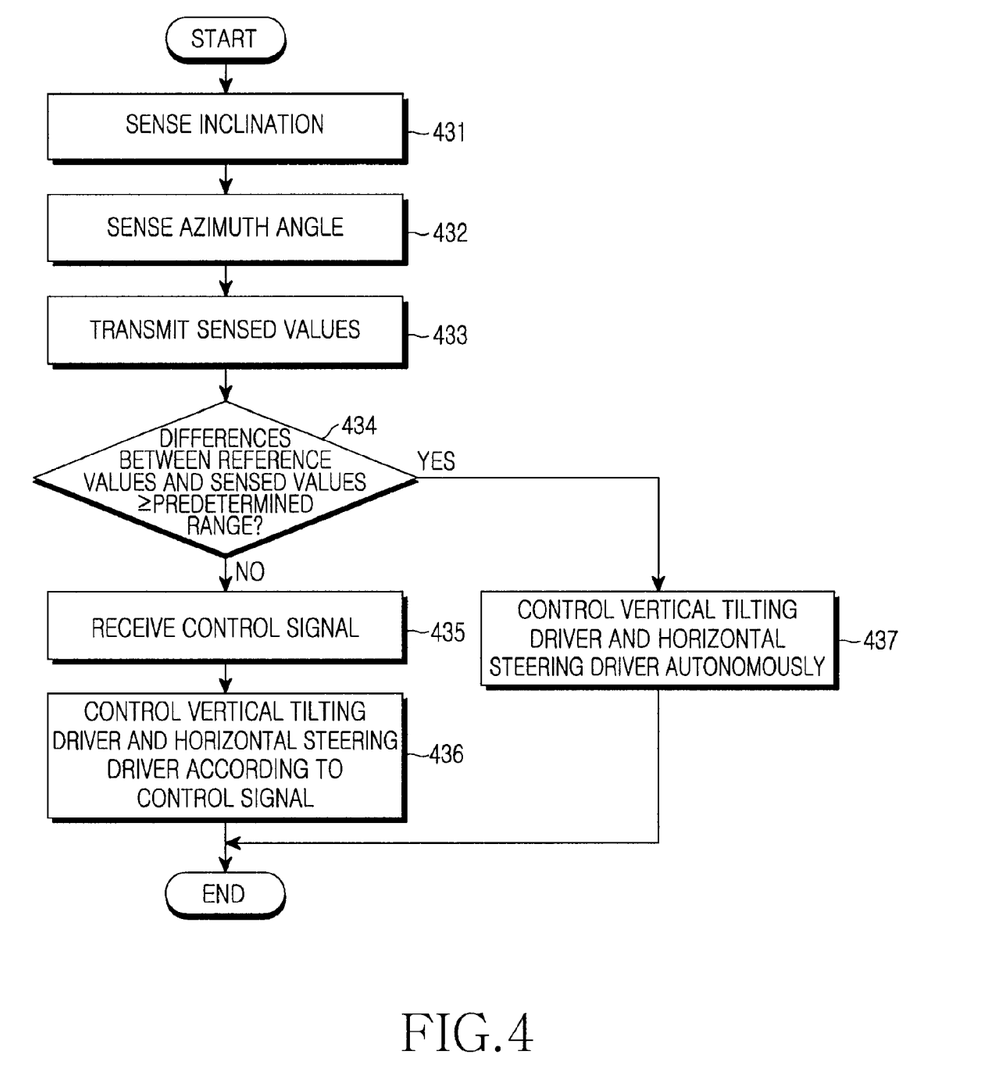
FIG. 4 is a flowchart illustrating an operation of an antenna system in a mobile communication BS antenna controlling system according to another embodiment of the present invention.

FIG. 4 is a flowchart illustrating an operation for controlling a mobile communication BS antenna controlling system according to another embodiment of the present invention. For example, the control operation can be performed in the antenna system 100 illustrated in FIG. 2.

Referring to FIG. 4, the inclination sensor 131 of the sensor unit 130 installed in the antenna system 100 senses forward or backward tilting of the antenna due to an external environment like wind pressure in step 431. In step 432, the azimuth angle sensor 132 senses whether the antenna horizontally rotates clockwise or counterclockwise.

In step 433, the antenna system 100 compares the outputs of the inclination sensor 131 and the azimuth angle sensor 132 with reference values and transmits values corresponding to the differences (i.e. deviations) to the remote control system 200.

In step 435, the antenna system 100 determines whether the sensed inclination and the sensed horizontal rotation value are different from the reference values by a predetermined or wider range. If the sensed values are different from the reference values by the predetermined or wider range, the antenna system 100 can perform a control operation for vertical tilting and horizontal steering in order to immediately compensate for the difference without waiting for a command from the remote control system 200 in step 437.

Meanwhile, if the deviations are provided to the remote control system according to the operation of step 433, the remote control system 200 outputs a control signal corresponding to an operator manipulation. Upon receipt of the control signal from the remote control system 200 in this manner in step 435, the antenna system 100 controls vertical tilting and horizontal steering according to the control signal in step 436.

In the above manner, the mobile communication BS antenna control system is configured and performs a control operation according to the present invention.

In the meantime, in the case where the camera module 60 is used to detect the displacement of the antenna as in the first embodiment of the present invention, acquired image information can be utilized for various purposes. Hereinbelow, a profit model that can create profits using the image information will be described in detail.

Figure 5:
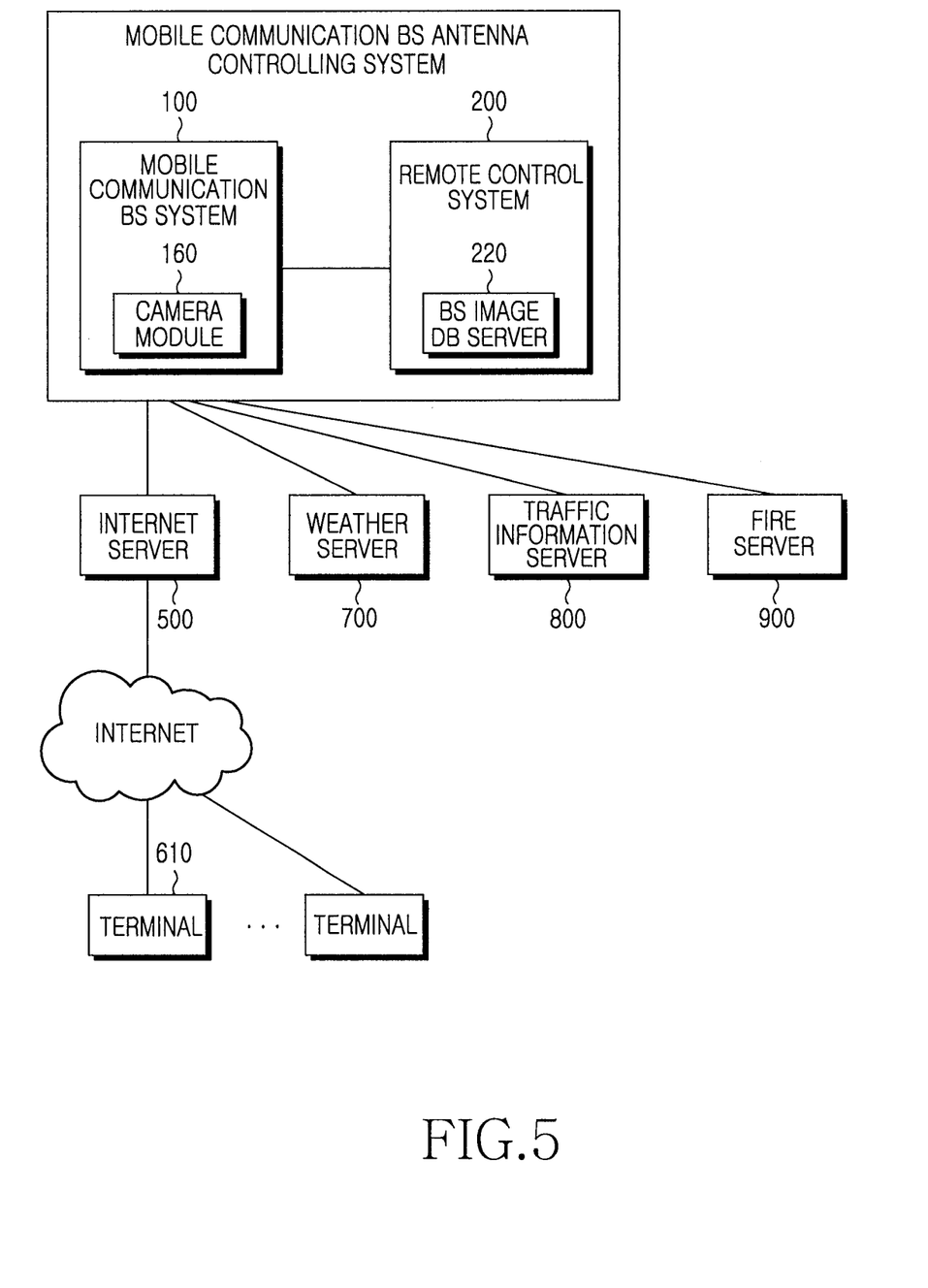
FIG. 5 is a block diagram of an image information providing system using a mobile communication BS antenna controlling system according to an embodiment of the present invention.

FIG. 5 is a block diagram of an image information providing system using a mobile communication BS antenna controlling system according to an embodiment of the present invention.

Referring to FIG. 5, in the image information providing system, the mobile communication BS antenna controlling system includes a plurality of mobile communication BS antenna systems 100 basically each having the camera module 160 illustrated in FIG. 1 for capturing a service area, for detecting a change in the position of a BS antenna and controlling the inclination and horizontal azimuth angle of the antenna to an initial status under the control of a remote control system 200, and the remote control system for storing image data received from the plurality of antenna systems 100 in a BS image DB server 220.

In this configuration, an Internet server 500 can be configured, which transmits images of areas requested by members (or general users) to their terminals 610 over the Internet, using images stored in the BS image DB server 220, that is, images captured by the camera modules of the mobile communication BS antenna systems 100 in real time.

The mobile communication BS antenna systems 100 are installed across an entire area to which a mobile communication service provider provides a service. The Internet server 500 has no need for separately installing cameras to provide real-time image information to members, thus saving equipment investment cost required for providing image information.

In this manner, the Internet server 500 can provide images of a particular area directly to users in real time. The Internet server 500 temporarily stores images received from the mobile communication BS antenna controlling system 100 and provides a requested service upon request for displaying past image information about an area from a member terminal 310.

In addition, the image data captured by the camera module of each BS and stored in the BS image DB server 220 can be provided to various servers via dedicated lines. For example, FIG. 5 illustrates a weather server 700 for checking a local weather status in a predetermined area by use of images captured by the camera modules 160 of the mobile communication BS antenna controlling system 100 and issuing a weather warning if there is a symptom indicating severe weather, a traffic information server 800 for determining the traffic status of a predetermined area in real time based on image information received from the camera modules of the mobile communication BS antenna control system 100 and providing traffic information accordingly, and a fire server 900 for checking images of a fire-reported area by use of image information received from the camera modules 160 in connection with a fire report and determining whether a fire has occurred, thereby enabling early fire detection.

While it has been described that the Internet server 500 provides a service to terminals connected over the Internet, the service can also be provided over a WIMAX mobile communication network or any other network, besides the Internet.

While the invention has been shown and described with reference to certain embodiments of the present invention thereof, it will be understood by those skilled in the art that various changes in form and details may be made therein without departing from the spirit and scope of the present invention as defined by the appended claims and their equivalents.

In the BS antenna control system 100, for instance, the camera module 160 may have a telephoto lens according to the usages of captured image information. An infrared camera for night vision can also be used along with a general camera in the camera module 160. Also, the camera module 160 may include a camera driver for changing the capturing position of a camera. The terminals can be any of Internet-enabled devices such as computers, PDAs, portable phones, and Internet TVs. To display information on a low-specification terminal 610, the Internet server 500 can convert an image captured by the camera module 160 to still images on a predetermined time unit basis and sequentially display the still images on the low-specification terminal 610.

The invention claimed is:

1. A system for controlling a mobile communication Base Station (BS) antenna, comprising:
   a plurality of antenna systems each installed in a BS; and
   a remote control system for monitoring and controlling the plurality of antenna systems,
   wherein each of the antenna systems comprises:
   an antenna module including a radiation plate and a radiation device for transmitting and receiving radio signals for a mobile communication service;
   a vertical tilting driver for vertically tilting the antenna module;
   a horizontal steering driver for rotating the antenna module;
   a sensor unit for sensing an inclination and horizontal rotation of the antenna module;
   a transceiver for transmitting data sensed by the sensor unit to the remote control system and receiving a control signal from the remote control system, and
   a controller for controlling an operation of the antenna system according to the remote control signal received from the transceiver, and
   wherein the remote control system comprises:
   a BS monitoring information DataBase (DB) server for accumulating the sensed data received from the plurality of antenna systems on a BS basis and an antenna system basis; and
   a remote control center for outputting control signals to the antenna systems to monitor the antenna systems remotely;
   wherein the sensor unit includes a camera module installed in the antenna system, for capturing an image of a service area of the antenna system, and the sensed data includes still image or moving picture data captured by the camera module; and
   wherein the controller of the antenna system controls storing an image captured during an initial installation of the antenna system as a reference image in a memory, compares an image captured later under a use environment with the reference image, and controls the vertical tilting driver and the horizontal steering driver to correct positioning of the antenna module if the difference between the later-captured image and the reference image is beyond a predetermined threshold.

2. The system of claim 1, wherein the camera module captures an image of a full service area of the antenna system.

3. The system of claim 1, wherein the camera module captures still images at predetermined intervals and captures moving pictures in real time according to a predetermined capturing-related control signal received from the remote control system.

4. The system of claim 1, wherein the sensor unit includes an inclination sensor for sensing the inclination of the antenna module and an azimuth angle sensor for sensing a change in the horizontal rotation of the antenna module.

5. The system of claim 1, wherein a communication channel is established between a BS and the remote control system and the transceiver transmits the sensed data on the communication channel, in order to process the sensed data in the same manner as a mobile communication service signal.

6. A system for controlling a mobile communication Base Station (BS) antenna, comprising:
   a plurality of antenna systems each installed in a BS; and a remote control system for monitoring and controlling the plurality of antenna systems, wherein each of the antenna systems comprises:
   an antenna module including a radiation plate and a radiation device for transmitting and receiving radio signals for a mobile communication service;
   a vertical tilting driver for vertically tilting the antenna module; a horizontal steering driver for rotating the antenna module; a sensor unit for sensing the inclination and horizontal rotation of the antenna module; a transceiver for transmitting data sensed by the sensor unit to the remote control system and receiving a control signal from the remote control system,
   a controller for controlling an operation of the antenna system according to the remote control signal received from the transceiver; and
   a memory for storing data needed for operating the antenna system, including data sensed
   by the sensor unit under the control of the controller, and wherein the remote control system comprises:
   a BS monitoring information DataBase (DB) server for accumulating the sensed data received from the plurality of antenna systems on a BS basis and an antenna system basis; and
   a remote control center for outputting control signals to the antenna systems to monitor the antenna systems remotely;
   wherein the sensor unit includes an inclination sensor for sensing the inclination of the antenna module and an azimuth angle sensor for sensing a change in the horizontal rotation of the antenna module; and
   wherein the controller of the antenna system stores, during an initial installation environment, an inclination sensed by the inclination sensor or an azimuth angle sensed by the azimuth angle sensor as a reference inclination or as a reference azimuth angle in the memory, compares an inclination or an azimuth angle sensed later under a use environment with the reference inclination or the reference azimuth angle, and controls the vertical tilting driver and the horizontal steering driver, if the difference between the later-sensed inclination with the reference inclination or the difference between the later-sensed azimuth angle and the reference azimuth angle is beyond a predetermined threshold.

7. The system of claim 6, wherein the sensor unit further includes a camera module installed in the antenna system, for capturing a full service area of the antenna system, and the sensed data includes still image and moving picture data captured by the camera module.

8. The system of claim 7, wherein the camera module captures still images at every predetermined interval and captures moving pictures in real time according to a predetermined capturing-related control signal received from the remote control system.

9. The system of claim 7, wherein the controller of the antenna system stores an image captured during an initial installation of the antenna system as a reference image in the memory, compares an image captured later under a use environment with the reference image, and controls the vertical tilting driver and the horizontal steering driver to correct positioning of the antenna module if the difference between the later-captured image and the reference image is beyond a predetermined threshold.

10. The system of claim 6, wherein the sensor unit includes the inclination sensor for sensing the inclination of the antenna module and the azimuth angle sensor for sensing a change in the horizontal rotation of the antenna module.

11. The system of claim 10, wherein the controller of the antenna system stores the inclination sensed by the inclination sensor and the azimuth angle sensed by the azimuth angle sensor as the reference inclination and the reference azimuth angle in the memory, compares an inclination and an azimuth angle sensed later under a use environment with the reference inclination and the reference azimuth angle, and controls the vertical tilting driver and the horizontal steering driver, if the difference between the later-sensed inclination with the reference inclination and the difference between the later-sensed azimuth angle and the reference azimuth angle is beyond a predetermined threshold.

12. The system of claim 6, wherein a communication channel is established between a BS and the remote control system and the transceiver transmits the sensed data on the communication channel, in order to process the sensed data in the same manner as a mobile communication service signal.

13. The system of claim 1, wherein phone numbers are allocated to the camera module and the remote control system for connecting a moving picture communication channel between them, such that the image data is processed in the same manner as a mobile communication service signal.

14. The system of claim 7, wherein phone numbers are allocated to the camera module and the remote control system for connecting a moving picture communication channel between them, such that the image data is processed in the same manner as a mobile communication service signal.

* * * * *